May 2, 1967 — A. A. DEDOES — 3,316,979
SOIL PENETRATING IMPLEMENT
Filed Oct. 1, 1965 — 2 Sheets-Sheet 1

INVENTOR.
ARNOLD A. DEDOES
BY Chas. M. Funkhouser
ATTORNEY

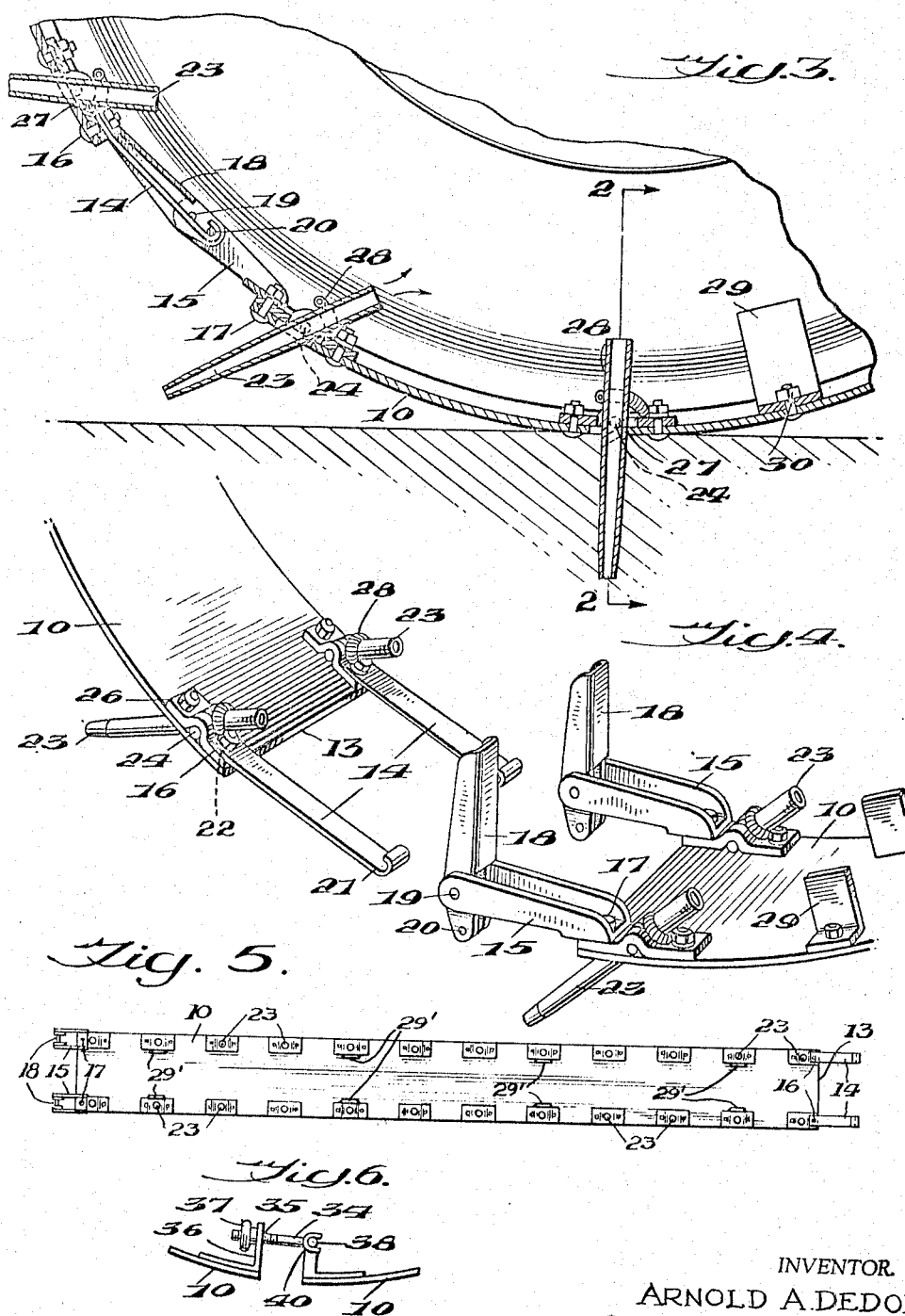

United States Patent Office 3,316,979
Patented May 2, 1967

3,316,979
SOIL PENETRATING IMPLEMENT
Arnold A. Dedoes, 2070 W. Eleven Mile Road,
Berkley, Mich. 48072
Filed Oct. 1, 1965, Ser. No. 491,929
3 Claims. (Cl. 172—22)

This invention relates to improvements in soil penetrating and coring implements and is a continuation-in-part of my copending application Ser. No. 332,040, filed Dec. 20, 1963, now Patent No. 3,221,822.

The present invention is specifically directed to an improvement in the demountable rim wherein the sheet metal rim described in my copending application is replaced by a rim of light weight spring steel metal material.

An important object of the present invention is to provide a novel form of demountable soil coring rim particularly adaptable for the small garden tractor which has many uses in addition to soil cultivating. For example, such tractors are frequently employed to operate lawn mowers, power tools and hauling devices.

Another object of the invention is to provide a tractor rim which shall reduce manufacturing costs to a minimum and thereby place the manufactured article within the economic reach of the average householder requiring the use of an implement.

Another object of the invention is to provide a demountable tractor wheel rim of the character designated which shall facilitate the attachment to and removal from the tractor wheel.

A further object of the invention is to provide a novel form of demountable rim which shall normally lie flat when removed from the wheel and thus occupy a minimum of storage space when not in use.

A further object of the invention is to provide an aerator rim of the character designated which shall engage the rubber tractor tire at all points of peripheral contact with the ground without permanent deformation or other deleterious effects when encountering stones or other hard objects.

A still further object of the invention is to provide a novel spring steel soil aerator tractor rim attachment which shall be more efficient in space requirements for storage as well as the application to the tractor wheel when in a limited and confined space.

These and other objects of the invention will be more manifest from the following specification and drawings and specifically set forth in the appended claims.

In the drawings:

FIGURE 3 is an enlarged fragmentary view partially in section of the soil penetrating elements and one form of clamp for securing the meeting ends of the rim segments;

FIGURE 4 is a perspective view of the segmental rim clamp shown in FIGURE 3, in open position;

FIGURE 5 is a plan view of the normal position of the shaped flat rectangular spring steel metal base prior to application to a tractor wheel; or storage; and FIGURE 6 is a view partially in section of a modification of the adjustable clamp for tightening the rim parts.

Experience and tests with the operation of small garden size tractors have proven that the equipment must be adaptable for convenient application without the use of special tools and occupy a minimum of storage space in the household garage or other confined space. For example, when the demountable soil aerating rims for rubber tired tractor wheels are preformed in circular shape from ordinary sheet metal, the rims being wide and of large circular form they occupy too much storage space for the average home storage facilities.

Another important feature of the present improvement in making the rim support for the soil coring elements of light weight flat spring steel plate material is that it is adapted to be sufficiently flexible from a flat position on the ground so as to be wrapped around the periphery of the rubber tractor tire by bringing the meeting ends of the steel plate together and this procedure holds the inside surface of the plate in frictional gripping contact with the tire. In other words, the steel rim support plate for the soil coring element is normally in the form of a flat rectangular article convenient for storage and packaging purposes. When applied to the tractor tire for soil treating purposes, the plate member is laid flat on the ground with the coring tubes down so that the tractor wheel may be moved directly on the plate base and the ends of the flexible plate drawn up and secured in frictional engagement with the tractor tread surface. This arrangement eliminates any necessity for jacking up the tractor wheel to apply the rim as required by similar rigid preformed circular rims heretofore employed for like purpose.

By making the demountable rim of light weight spring steel, such as about .0320 inch in thickness, adequate strength is obtained and the rim is not subject to permanent set or deformation occasioned by the general use of the implement on stony or irregular ground surfaces. In the present instance the spring steel rim is of sufficient thickness to prevent such set and at the same time facilitate the handling of the tractor when in use by not appreciably increasing the diameter of the tractor wheel. Furthermore, by making the rim plate of light spring steel metal, it will normally lay flat on the ground ready for packaging, storage or other conditions to occupy minimum space and when applied to the tractor wheel, the ends of the plate may easily be brought together in wrap-around tread contact relation with the tractor wheel tire.

Figure 1:
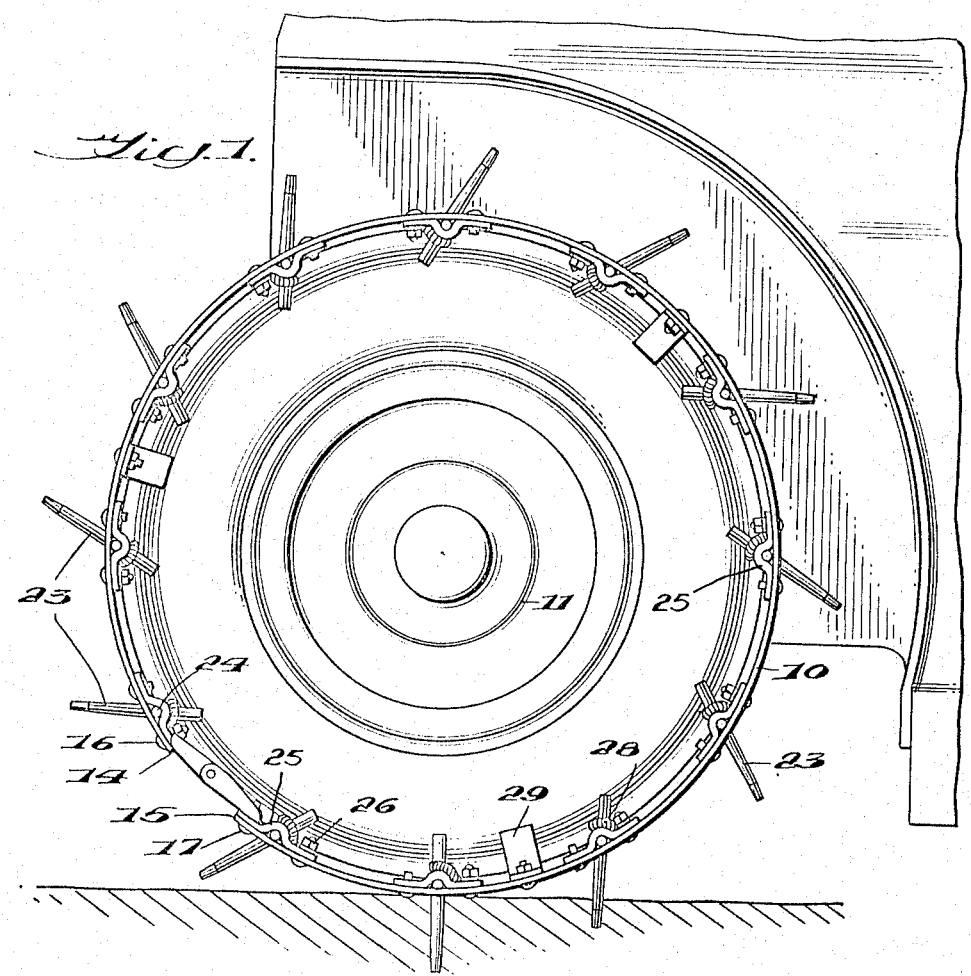
FIGURE 1 is a view in elevation of a demountable rim embodying the invention.
Figure 2:
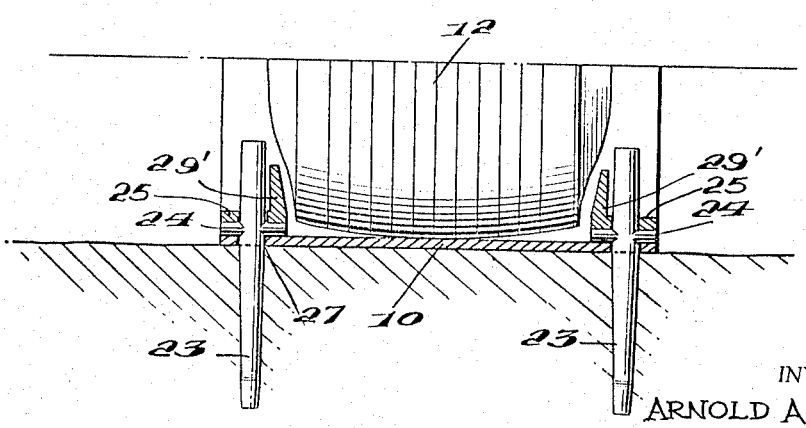
FIGURE 2 is a fragmentary front view partially in section of a rim segment and tire.

Referring to FIGURES 1, 2 and 5 of the drawings, there is shown at 10 a flat spring steel metal plate member of novel construction. The steel plate member 10 for mounting the soil coring elements being of light weight highly tempered spring steel material, provides a more efficient garden implement. This rim 10 is designed to be of a diameter substantially the same size as the outer circumference as the tractor wheel tire so that a tight circumferential fit shall be obtained. If the rim is divided, as indicated by the numeral 13, the meeting end parts include a cooperating pair of adjustable clamp members 14 and 15 secured to the respective adjacent ends of the rim in any suitable manner, such as bolts or rivets indicated by the numerals 16–17. This arrangement facilitates mounting and demounting the rim 10 on its associated wheel, as well as to take care of any variations in the diameter of the tractor tire and at the same time draw the rim 10 tightly thereon as a comparatively rigid and integral operating unit.

The clamp members 14 and 15 are drawn together by an appropriate channel shaped metal hand lever member 18 pivotally mounted on member 15, as shown in FIGURES 3 and 4, and which is also channel shaped and having a pivot member 19 connecting the channel side. The outer extremity of the channel shaped channel member 18 includes a connecting pivot member 20 for holding the lever in engagement with a hook shaped end portion 21 on the extremity of member 14. It will be noted in FIGURE 2 that the pivot pin 20 is slightly higher than the pin 19 when the parts are cammed together to form a snaper streamlined symmetrical connection and also minimize the collection of dirt.

This pivotal connection is of the usual snap-over connection and may be substituted by the threaded T-bolt and nut connection shown in FIGURE 6, hereinafter more specifically described. Whichever form of clamp is employed, each clamp unit is positioned on the rim 10 at the lateral meeting edges thereof. For example, in FIGURE 2, holes 22 are provided in the end portion of the rim 10 for the clamp member 14, while in FIGURE 6 the threaded portion of the bolt takes care of an adjustment which may be necessary. Whichever form is employed, the clamp members are located so as to be accessible beyond the sides of the rubber tire 12 as shown in FIGURE 2 so as to be accessible to adjust the rim 10 circumference to fit any tractor size for which the device is intended to be used.

To further aid in retaining the rim 10 on the tractor wheel tire, inwardly projecting guide or cleat plate members 29 are secured to the inner side of the rim 10, in any suitable manner by bolts 30, or welding if desired.

On the outside peripheral surface of the novel rim band 10 are located a plurality of outwardly extending and slightly tapered tubular steel soil engaging members 23—23. The ground piercing sidewall ends of the tubular members are preferably sharpened so as to facilitate entry into the soil being worked or cut core holes in sod in the case of preparing a lawn. The upper end portions of the members 23 are provided with integral side extensions 24—24, which form pivotal bearing supports for retention in a bearing member 25.

These bearing members are mounted on the rim edge by suitable bolts 26 or they may be welded if desired. It will be noted that each of these tubular soil engaging members project through an elongated slot opening 27 formed in the rim edge and mounted so as to pivotally swing in the slotted opening at approximately 30° angle to the rim surface 10 and thus allow for proper vertical penetration into the soil when the tractor wheel is rotating. This arrangement also provides proper withdrawal of the member to prevent ragged or uneven disturbance of the soil. This operation is especially desirable in working grass sod since the tubular elements 23—23 are pivotally mounted in suitable die cast bearing brackets 25—25, as shown in the modification illustrated in FIGURE 2. These coring elements may also be controlled by a coil spring 28, as shown in FIGURE 3. Furthermore, the die cast bracket units 25—25 are designed to include the guides 29'—29' as an integral unit and thus reduce the cost of manufacture as well as improve the use of the device as a demountable soil aerator.

While I have shown and described a specific form of demountable spring steel metal band and die cast metal bracket and tire guide for supporting and operating the soil coring implements, it is obvious that various changes may be made therein without departing from the invention as specifically set forth in the claims.

What I claim is:

1. A demountable soil aerating rim attachment for use on a rubber tired tractor wheel comprising a normally flat spring steel metal plate member of substantially rectangular shape and .032 inch in thickness so as to be adapted to be sprung longitudinally under pressure from the normally flat position to form a tire band fitting the circumference of the rubber tire on said tractor wheel and supporting the same on the ground without deformation thereof, said flat spring steel plate member having a plurality of elongated slot means formed in the surface thereof and spaced laterally from the edges of the tire, a plurality of elongated tubular soil coring elements pivotally mounted for swinging movement in said slots, and means connecting the opposite ends of said plate member when wrapped around the periphery of said tractor tire.

2. As a new article of manufacture, a wrap around demountable soil aerating rim implement for a rubber tired tractor wheel comprising a flat rectangular spring steel supporting plate substantially .032 inch in thickness and the length of the periphery of the tractor tire so as to support the same on the ground without lateral deformation, a plurality of elongated slot means formed in the surface of said plate and spaced laterally from the side edges of said pate, a plurality of elongated tubular soil coring elements pivotally mounted for swinging movement in said slots, and means at the opposite ends of said steel plate member for drawing the meeting ends of said spring plate together to wrap around the tractor wheel tire tread with constant pressure and without appreciably changing the operative diameter of the tractor wheel.

3. As a new article of manufacture, a wrap around demountable soil aerating rim implement for a rubber tired tractor wheel comprising a flat rectangular spring steel supporting plate substantially the length of the periphery of the tractor tire so as to support the same on the ground without lateral deformation, a plurality of elongated slot means formed in the surface of said plate and spaced laterally from the side edges of said plate, a plurality of elongated tubular soil coring elements pivotally mounted for swinging movement in said slots, a die cast metal bearing unit for pivotally supporting the soil coring elements in said slots and guiding the spring metal plate relative to said tractor tire, and means at the opposite ends of said plate for drawing the meeting ends thereof to wrap the same around the tractor tire.

References Cited by the Examiner

UNITED STATES PATENTS

| | | | |
|---|---|---|---|
| 1,419,533 | 6/1922 | Ashby | 301—40 |
| 2,441,471 | 5/1948 | Chausse. | |
| 2,587,406 | 2/1952 | Talbert | 172—71 X |
| 2,700,926 | 2/1955 | Goit | 172—22 |
| 3,221,822 | 12/1965 | Dedoes | 172—22 |

ABRAHAM G. STONE, *Primary Examiner.*

R. L. HOLLISTER, *Assistant Examiner.*